Dec. 17, 1968  F. T. GOULD  3,416,883
PROCESS FOR PREPARING CHEMICALLY PURE FERROUS CARBONATE
Filed Sept. 26, 1966
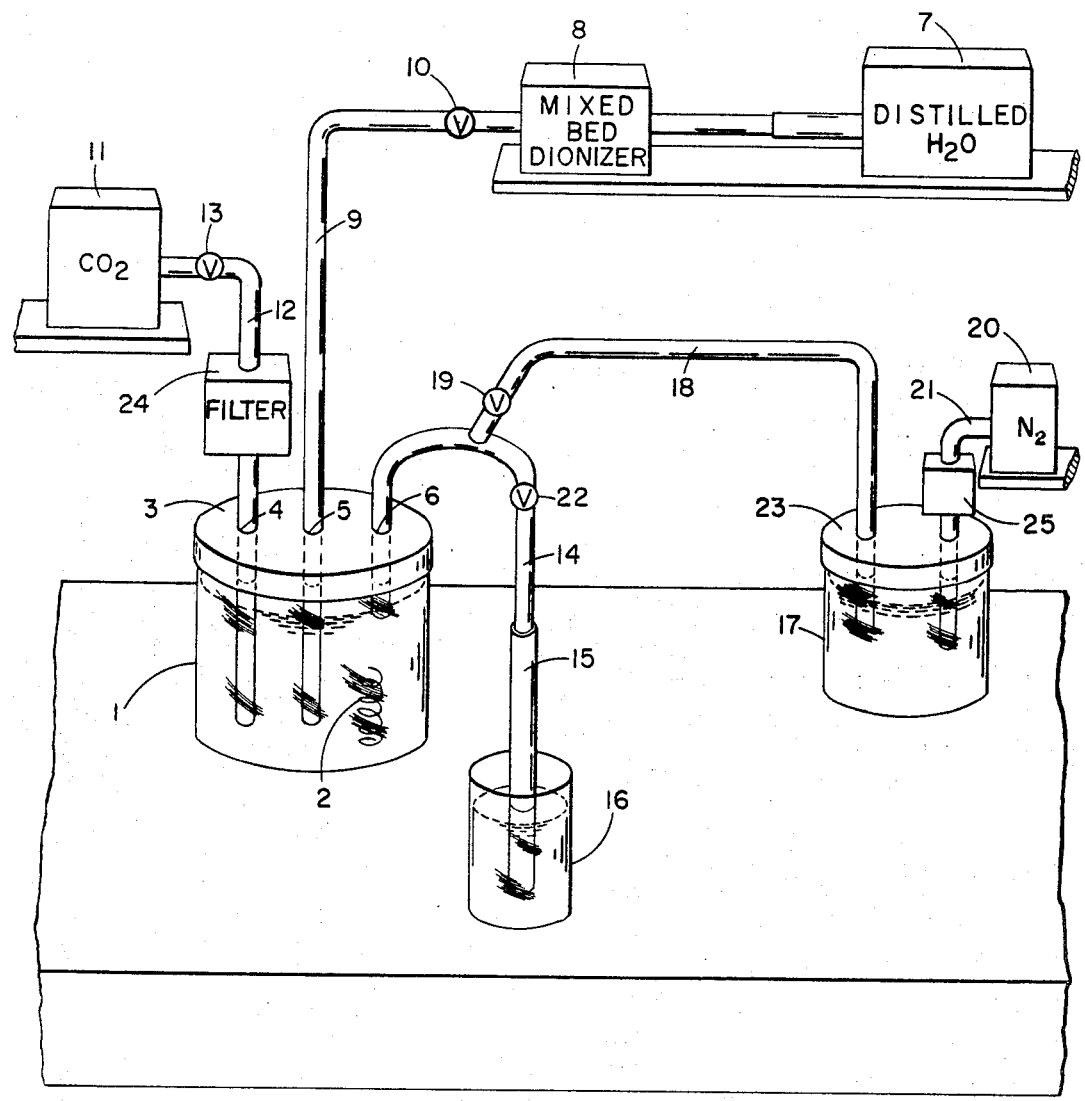
INVENTOR.
FLOYD T. GOULD
BY *Richard M. Jennings*
ATTORNEY.

United States Patent Office 3,416,883
Patented Dec. 17, 1968

3,416,883
PROCESS FOR PREPARING CHEMICALLY PURE FERROUS CARBONATE
Floyd T. Gould, Wayland, Mass., assignor to Laboratory for Electronics, Inc., Boston, Mass., a corporation of Delaware
Filed Sept. 26, 1966, Ser. No. 582,001
6 Claims. (Cl. 23—61)

This invention relates in general to the preparation of a ferrous ion source and more particularly to a process for preparing chemically pure ferrous carbonate.

Ferrous carbonate is a convenient source of the ferrous ion since the carbonate anion can be easily removed from the final product solution. Heretofore, the methods of preparing ferrous carbonate have relied exclusively upon the precipitation of the ferrous carbonate compound from water solutions of soluble ferrous salts. The principle disadvantage and concomittant limitation of current methods lie in the heavy contamination of the final ferrous carbonate product with the original anion. This results from the simultaneous formation of basic salts, double salts and the mechanical inclusion of the byproduct salt during the preparation process. These impurities, although not a limitation in some instances, obviously cannot be tolerated in final product solutions that are required, by their end use, to be chemically pure.

In brief, the present invention contemplates the preparation of chemically pure ferrous carbonate by first initiating a continuous flow of carbon dioxide and feeding it to a reaction vessel filled with deionized water to saturate the latter with carbon dioxide. Then a pure iron wire, after being thoroughly cleaned with hydrochloric acid to remove any oxidation thereon, is immersed into the water. The carbon dioxide reacts with the water to form carbonic acid which in turn reacts with the iron to produce ferrous carbonate with hydrogen as a byproduct. The flow of carbon dioxide is continued until the solution is saturated with ferrous carbonate. At this time, the ferrous carbonate solution is removed from the reaction vessel and subjected to a nitrogen purge which acts to precipitate the chemically pure ferrous carbonate from the solution. Inasmuch as there are no salts present during the reaction, a highly chemical pure ferrous carbonate is obtained.

The present invention will be best understood from the following detailed description when taken in conjunction with the accompanying drawing in which:

The preferred apparatus for carrying out the present invention is illustrated in diagrammatic form.

With reference now to the drawing, it will be observed that a container 1, preferably a five liter Pyrex flask, serves as a reaction vessel and is adapted to receive a volume of water. A rubber stopper 3 having three holes 4, 5 and 6, therein, is inserted into the top of flask 1. A glass carboy 7 filled with distilled water is connected to the inside of container 1 by way of a mixed bed deionizer 8 and a polyethylene tube 9. Mixed bed deionizer 8 operates to remove ions from the distilled water and may comprise, for example, any one of numerous well known ion exchange plastic resins. In the outlet line from the mixed bed deionizer 8 there is inserted a valve or stopcock 10 to control the flow of distilled water into the container 1.

A carbon dioxide supply 11 cooperates with the inside of container 1 by way of a polyethylene tube 12 which is inserted through hole 4. In the polyethylene tube 12, a short distance away from the carbon dioxide supply 11, there is inserted a needle valve 13 to control the carbon dioxide rate of flow. Of course, it will be recognized that the needle valve 13 may be provided as an integral part of the carbon dioxide supply 11 along with a pressure reducer (not shown) as is usual in the case of commercial containers of carbon dioxide and other commonly used gases. It has been found that commercial containers of liquid carbon dioxide contain sufficient amounts of free oxygen to passivate the surface of the iron wire, which is placed in the reaction vessel 1, and thereby prevent the completion of the desired reaction. A filter 24 comprising a water slurry of crude ferrous carbonate is inserted in the tube 12 between valve 13 and reaction vessel 1 to remove the free oxygen from the carbon dioxide before the latter enters reaction vessel 1.

A U-shaped tube 14, preferably made of polyethylene, passes through hole 6 of rubber stopper 3 and extends about one-quarter inch down inside container 1. The free end (end outside container 1) of U-tube 14 has a one-fourth inch diameter rubber extension 15 attached thereto which in turn hangs freely inside the walls and almost to the bottom of a Pyrex glass cylinder 16.

Immediately downstream from valve 22 an outlet line 18 is tapped off tube 14 and led to a receiver flask 17. Inserted in line 18 (adjacent to the tap into line 14), is a stopcock or valve 19 to control the flow of solution through line 18 to receiver flask 17. Also, a nitrogen supply 20 is connected to receiver container 17 by way of the tube 21. Nitrogen supply 20, like carbon dioxide supply 11, may be provided with a pressure regulator and needle valve integrally associated therewith to control the flow of nitrogen to container 17. Polyethylene tubes 18 and 21, respectively, are inserted through holes of a rubber stopper 23 fitted in the top of flask 17. A filter 25 comprising a water slurry of ferrous carbonate is inserted in tube 21 to remove free oxygen from the nitrogen as it passes through the tube.

In practice, valve 10 is opened and distilled water flows out of carboy 7 through tube 9 and into container 1. Before entering container 1 the distilled water is passed through a mixed bed deionizer 8 wherein any ions which were leached out of the soft glass carboy 7 are removed from the water. It follows that the reaction vessel, container 1, is filled with very pure water. Simultaneous with the flow of water into container 1, needle valve 13 is opened so that carbon dioxide from supply 11 is fed into and bubbled through the volume of water residing in the reaction vessel.

The water flow is allowed to continue until the overflow out of container 1 fills cylinder 16 to about two-thirds capacity by way of U-tube 14 and rubber attachment 15. Of course, valve 19 is closed while valve 22 is open during this operation. At this point, the flow of water from carboy 7 is terminated by closing valve 10. However, the carbon dioxide flow continues for around twenty-four additional hours at a flow rate of approximately one liter per minute. By virtue of bubbling the carbon dioxide through the pure water, any oxygen dissolved in the latter is flushed away.

Toward the end of the twenty-four hour period the water becomes saturated with carbon dioxide (at room temperature). At this time an analytical grade iron wire 2 (about 10 mils. in diameter), formed into about a one inch diameter helix to provide greater reaction surface area, is inserted into the volume of water residing in container 1. Prior to placing the iron wire (acting as an iron atom source) in the container, the iron wire is cleaned in a vapor degreaser, then in a detergent and again in the vapor degreaser. The surface of the iron is then activated (the desired reaction is extremely slow if the iron wire is not activated) by placing the wire in a diluted solution (5%) of hydrochloric acid. That is, the hydrochloric acid operates to neutralize any oxidation of the iron. After the acid bath the iron wire is thoroughly washed in five changes of distilled water adjusted to pH 9 with sodium hydroxide (NH₄OH), immersed in clean acetone and finally, quickly dried by a warm air blast. This final drying prevents oxidation while the iron is exposed to the air during the transfer to the reaction vessel.

Prior to inserting the iron into container 1, the flow rate of carbon dioxide is increased to several liters per minute by adjusting needle valve 13. This enables the wire to be inserted by opening rubber stopper 3 while preventing any appreciable inflow of air (oxygen) to the container 1.

After insertion, the reaction that produces the chemically pure ferrous carbonate begins almost immediately. That is, the carbon dioxide reacts with the water to form a slight amount of carbonic acid ($H_2CO_3$), which in turn reacts with the iron helix to form chemically pure ferrous carbonate ($FeCO_3$). The overall reaction may be represented by the following equations:

$$H_2O + CO_2 \rightarrow H_2CO_3$$

$$Fe + H_2CO_3 \rightarrow FeCO_3 + H_2\uparrow$$

It will be noted that since the water is saturated with carbon dioxide the newly formed ferrous carbonate remains in solution.

As soon as the iron has been inserted into the water the flow rate of carbon dioxide is decreased to about fifty milliliters per minute. The reaction may be allowed to continue until the solution is saturated with ferrous carbonate which, under the above mentioned conditions, amounts to a concentration of about 0.018 M (2.1 gm./liter) of ferrous carbonate.

However, inasmuch as the reaction rate slows down as the concentration of ferrous carbonate increases, it is more efficient to withdraw about eighty percent of the solution from container 1 when the concentration of ferrous carbonate reaches about .013 M (1.5 gm./liter). Withdrawal is initiated by closing valve 22 in tube 14 to stop the overflow of water into container 16 and opening valve 19 to connect receiver flask 17 with container 1. Under these conditions the carbon dioxide flow rate is then increased to about two liters per minute. The increased carbon dioxide pressure acts upon the solution in container 1 to force the solution through tubes 14 and 18 into receiver flask 17.

It must be remembered that ferrous carbonate is unstable at room temperature when situated in an air atmosphere. Consequently, the dissolved ferrous carbonate must be kept in an atmosphere of pure carbon dioxide. To this end, prior to removing the solution of ferrous carbonate, carbon dioxide, and water from reaction vessel 1, flask 17 is subjected to a nitrogen purge by means of nitrogen supply 20 to remove all the air therefrom. As a result the solution is transferred to an oxygen free atmosphere.

Once in receiver flask 17 the ferrous carbonate may be used directly as a solution or it can be crystallized and used as a slurry. If the latter is desired, the solution is subjected to a nitrogen purge by closing stopcock 19 and turning on nitrogen supply 20. The rate of flow of nitrogen gas is set, for example, to around one liter per minute which will in turn precipitate about ninety percent of the dissolved ferrous carbonate as a colorless crystalline flake in about twenty-four hours. That is to say, the solubility of ferrous carbonate varies directly as the degree of solution saturation with carbon dioxide. The nitrogen flush removes the carbon dioxide from the solution to thereby decrease the concentration of carbon dioxide which in turn causes the ferrous carbonate to precipitate. The crystalline product is drawn off as a slurry and the remaining clear liquid returned to container 1 (reaction vessel) to participate in another production of ferrous carbonate.

The invention is illustrated by the following examples. These examples are not intended to serve as limitations on the scope of the invention described herein but are intended to serve as illustrations of various methods in which the invention may be practiced.

Example I

Five liters of distilled water were passed through a mixed bed deionizer at the rate of 20 liters per hour into a five liter, round bottom Pyrex flask receiver which was fitted with a three hole rubber stopper. Through two of the holes were inserted lengths of six millimeter Pyrex glass tubes, both of which extended to within a millimeter of the bottom of the flask. Through the third hole was inserted one arm of a U tube so as to extend about ¼″ beyond the lower surface of the stopper and so that the outer end pointed almost downward. A ¼″ length rubber tube was attached to it. The free end of this tube was filled with a 12″ length of 6 mm. Pyrex glass tube and the free end of it was placed 6″ below the surface of water in a 2 x 18 inch glass cylinder.

The carbon dioxide supply was a fifty pound, net content, cylinder equipped with a pressure reducer and needle valve to control flow. Before being fed to the system it was necessary to remove traces of oxygen contained therein because even very minute amounts deactivate the surface of the iron which results in slowing and finally complete stoppage of the reaction. Traces of oxygen were removed from the supply by allowing it to bubble through a mixture of ferrous hydroxide in ammonium/chloride-water solution.

The flow rate was about one liter a minute. Twenty-four hours later the carbon dioxide flow was increased to several liters per minute and 56 grams of thoroughly cleaned, surface activated, .010″, pure iron wire helixes were inserted through a small opening in the top of the five liter Pyrex flasks. After the twenty-four hour purge, the water in the flask was for all purposes of this synthesis, free of dissolved oxygen and was saturated with carbon dioxide. Room temperature was 75° F. The reaction begins immediately as was shown by the formation of bubbles on the surface of the wire. After three days the concentration of ferrous carbonate was 0.013 M (1.5 gm./liter). This was determined by titration with standard potassium permanganate ($KMnO_4$). After five days the solution was saturated at .018 M (2.1 gm./liter).

Two methods were used to recover the product salt but they do not produce exactly the same product. To produce ferrous carbonate the solution was purged with oxygen free nitrogen at one liter per minute causing 90% of the dissolved ferrous carbonate to precipitate in twenty-four hours. The product was then removed from the system as a slurry.

The second method involved heating the solution to boiling while it was blanketed with nitrogen. The product precipitated rapidly but as pure ferrous hydroxide which was also withdrawn as a slurry. It can be used as the hydroxide for some applications or reconverted to the carbonate by bubbling carbon dioxide through it.

Example II

The system and procedure were the same as Example I but the carbon dioxide pressure throughout was maintained at two atmospheres absolute. This caused an increase in the solubility of the carbon dioxide but decreased the solubility of the ferrous carbonate and the rate of reaction was slightly increased.

Example III

The system was the same as in Example I except that an additional receiver was added. A slow, continuous flow of saturated ferrous carbonate solution entered it while the same amount of depleted solution was pumped back to the reactor. Depletion was caused by nitrogen purging and the product collected continuously in the bottom of the receiver. The process was continuous and automatic.

While certain features of the invention have been described in detail, it will, of course, be apparent that other modifications may be made within the scope contemplated by other inventions. For instance, the reaction may be made continuous by adding a feedback line from receiver flask 17 to the reaction vessel (container 1). In this manner the formation of the carbonate and the precipitation of the ferrous carbonate product are carried out continuously and simultaneously. Also, if pure ferrous hydroxide is desired, the pure ferrous carbonate solution may be boiled while being purged with nitrogen gas. This causes the carbon dioxide to be rapidly eliminated from the solution and simultaneously, due to the thermal decomposition of the carbonate, forms a white floc of ferrous hydroxide [$Fe(OH)_2$]. In addition, it has been found that a slight amount of boron, probably as a borate, which is unacceptable in some end applications, is leached out of the Pyrex glass containers used in the system. To eliminate this contaminant the process may be carried out in an entirely plastic (polyethylene) system. Consequently, the invention herein described is to be construed to be limited only by the spirit and scope of the appended claims.

What is claimed is:

1. A process for preparing chemically pure ferrous carbonate comprising the steps of exposing a container of water to a flow of carbon dioxide, placing metallic iron into said water, said carbon dioxide reacting with said water and metallic iron to form chemically pure ferrous carbonate in solution, and removing the chemically pure ferrous carbonate from the solution.

2. A process as claimed in claim 1 comprising the additional step of passing the water through a mixed bed deionizer to remove any impurities prior to feeding the water to the container.

3. A process as claimed in claim 1 wherein the ferrous carbonate is removed by subjecting the ferrous carbonate solution to a nitrogen purge to precipitate the chemically pure ferrous carbonate.

4. A process as claimed in claim 3 wherein the iron comprises an iron wire.

5. A process as claimed in claim 4 comprising the additional step of subjecting the iron wire to an acid bath to neutralize any oxidation of the iron prior to placing the iron wire into the water.

6. A process as claimed in claim 5 wherein the carbon dioxide flow rate is between about 50 milliliters per minute and about 2 liters per minute.

References Cited

UNITED STATES PATENTS

| | | | |
|---|---|---|---|
| 842,452 | 1/1907 | Flugge | 23—61 |
| 1,008,321 | 11/1911 | Gill | 23—200 |
| 1,327,061 | 1/1920 | Penniman et al. | 23—200 |
| 3,264,056 | 8/1966 | Konz | 23—61 X |

OSCAR R. VERTIZ, *Primary Examiner.*

G. T. OZAKI, *Assistant Examiner.*

U.S. Cl. X.R.

23—200